United States Patent [19]

Blatin

[11] Patent Number: 4,815,009
[45] Date of Patent: Mar. 21, 1989

[54] ALGORITHM FOR FILLING AN IMAGE OUTLINE

[75] Inventor: Vladimir Blatin, Sherman Oaks, Calif.

[73] Assignee: Xerox Corporation, Stamford, Conn.

[21] Appl. No.: 40,920

[22] Filed: Apr. 21, 1987

[51] Int. Cl.⁴ .............................................. G06F 15/70
[52] U.S. Cl. ................................... 364/518; 364/521; 340/734; 340/747
[58] Field of Search ....................... 364/518, 521, 522; 340/728, 730, 731, 729, 703, 734, 739, 740, 744, 747, 732

[56] References Cited

U.S. PATENT DOCUMENTS

| | | | |
|---|---|---|---|
| 4,331,955 | 5/1982 | Hansen | 340/728 |
| 4,603,431 | 7/1986 | Grover et al. | 382/56 |
| 4,631,532 | 12/1986 | Grothe | 340/703 |
| 4,635,050 | 1/1987 | Grothe et al. | 340/734 |
| 4,658,247 | 4/1987 | Gharachorloo | 340/747 |
| 4,718,105 | 1/1988 | Lipkie et al. | 382/56 |
| 4,730,261 | 3/1988 | Smith | 364/521 |

OTHER PUBLICATIONS

"Interpress Electronic Printing Standard", Version 2.1 XSIS 048404, Apr. 84, Xerox Cor., pp. 56;57.
"Fundamentals of Interactive Computer Graphics", Foley et al., pp. 432–433 and 451–455.

Primary Examiner—Gary V. Harkcom
Assistant Examiner—Randy W. Lacasse
Attorney, Agent, or Firm—Robert E. Cunha

[57] ABSTRACT

A method of converting an outine defined by a plurality of vectors into an optimum set of trapezoids which can be filled in using standard printer techniques. The process is to determine all points in the outline where two vectors intersect, and the location of all scan lines that intersect these points. Then a winding number is calculated for each trapezoid formed by the scan lines and vectors, and Fill or Not Fill states are assigned to all trapezoids. Finally, all adjacent Fill areas separated by vectors are joined to form a final set of trapezoids which define the area to be filled.

8 Claims, 3 Drawing Sheets

ALGORITHM FOR FILLING AN IMAGE OUTLINE

BACKGROUND OF THE INVENTION

This is an algorithm for filling in any digitally formed outline of an area, including those with concave outlines, and specifically comprises a method of segmenting the entire area into trapezoids which are more easily filled.

In the past, it was typical for each printing equipment manufacturer to design his text generating machines in the form of terminals and typewriters, image forming equipment in the form of scanners for pictures and computers for graphics, and printers, to interface directly with one another. However, there was no standardization between manufacturers. Equipment from one manufacturer could not be used with equipment from another, and large industry inefficiencies resulted. Stated differently, there was no industry wide standard interface that could be used between pieces of publishing systems.

To remedy this problem, the Interpress Printing Language and the standard Interpress Interface were created and adopted by some manufacturers. Now, for example, using the Interpress language and protocols, grahics generated on one manufacturers computer can be printed on another's printer.

One standard feature in a publishing system is the requirement of filling in, at the time of publishing, an area that had been originally defined as an outline at the graphics generating station. More specifically, the outline received by the printing system may be defined in the form of vectors, while the printer itself needs its information in the form of rasters. The problem is made more difficult when the outline defined by vectors has concave portions, where the vectors cross each other as in a five-cornered star, or where the outline comprises separate but overlapping shapes.

By way of definition, an outline is said to be composed of trajectories, each trajectory being made up of a series of connected vectors. For example, a five pointed star comprises one trajectory comprising five vectors. Another case is the filling in of areas that are formed by one set of vectors within, or partially overlaying, another set of vectors. For example, a trajectory comprising four vectors defining a square may be overlapped or enclosed within a second trajectory comprising a three vector triangle. These outlines may or may not be filled in correctly depending on the algorithm used.

A known method for determining the areas of an outline that should be filled in is the calculation of a winding number. This method is described in the Interpress Xerox System Integration Standard, pages 56 and 57. The winding number is the number of times the area in question is surrounded by an outline, and is the count of the surrounding clockwise closed trajectories minus the count of the surrounding counterclockwise closed trajectories. The remaining problem is how to divide up the outline into manageable areas that can be conveniently filled in by the hardware or software.

An algorithm can be constructed that will calculate, for each point, whether that point is within the vector-defined area by testing whether the current point is within a connected set of vectors that exist above, below and to both sides of the point, but this kind of program is time consuming.

In the case of crossed vectors and concave outlines, there may be several vectors in each direction which have to be handled by the computation, and, depending on the algorithm, these computations may not be accomplished correctly. To make sure that the outline is processed properly, the graphics generator may be set up to generate a complex form in simple parts and have them filled separately to generate the whole complex area.

What is required, in a system that is to be used in the Interpress environment, is an algorithm for finding the optimum set of areas to allow the efficient fill-in by a raster scanner printer of any outline, regardless of complexity, originally defined as trajectories by the graphics generating equipment.

SUMMARY OF THE INVENTION

The object of the invention is to convert the outline defined by a plurality of trajectories, each trajectory comprising a plurality of vectors, into a set of trapezoids which can be filled in using standard printer techniques. More specifically, the conversion must be into a set of data that defines each trapezoid. One set of data comprises two scan lines defining the vertical right and left edges of the trapezoid, two points on the left scan line that correspond to the left corners of the trapezoid, and two slopes through the left corners which define the upper and lower edges of the trapezoid. As an alternative, the trapezoid can also be defined as a set of four points, or 4-tuple, $\{(x_s,y_s), (x_s,y_e), (x_e,y_s'), (x_e,Y_e')\}$, where "s" is "start" and "e" is "end". The hardware of the disclosed embodiment uses the first alternative, but the systems are equally useful. For the disclosed embodiment, it is assumed that every trajectory is closed. That is, the end point of the last vector is identical to the start point of the first vector, $(x_s,y_s)=(x_e,y_e)$. Also, if the outline is located partially off the page, the program will delete the protruding portion of the outline to conform the image to the edge of the page.

The algorithm accomplishes its function by first locating all points where vectors intersect. Next identified are the scan lines that pass through these points. The area of the outline is now divided up into small areas by the vectors and scan lines, all areas being trapezoids having vertical sides comprising vertical scan lines, and upper and lower slopes defined by the slopes of the vectors. It is possible at this stage to have triangle areas, these being defined for the purposes of this algorithm as trapezoids having one vertical side of zero height. Another special case is the rectangle $s_x=s_e=0$, where $s_s$ and $s_e$ are vector slopes.

Next, for each column between scan lines, each small area in the column is tested to determine if it should be filled in. The test starts by assigning a winding number of zero to the area below the lowest vector. Then, proceeding in a vertical direction, as each vector is passed, the winding number is increased by one if the vector direction is from left to right, and decreased by one if the vector direction is from right to left. Each small area in the column is now assigned a winding number. In one alternative, if that number is non-zero, the area should be filled in. An area with a winding number of zero is defined to be outside the outline, and not filled in. Of course, the system will work equally well in any direction, the upward direction was chosen arbitrarily. In another alternative, as exemplified by the Interpress Standard (IP 3.0), the program will fill in all areas where the winding number is odd. It is the choice of the creator of the outline to choose the rule that will produce the desired result. The algorithm described in this specification can easily be changed to conform to either rule.

Finally, all small connected areas in each column are combined to produce the final trapezoids. The resultant program is efficient since it must only test one point in each area, and will generate the outline correctly, regardless of the complexity of the trajectories.

DETAILED DESCRIPTION OF THE INVENTION

Figure 1A:
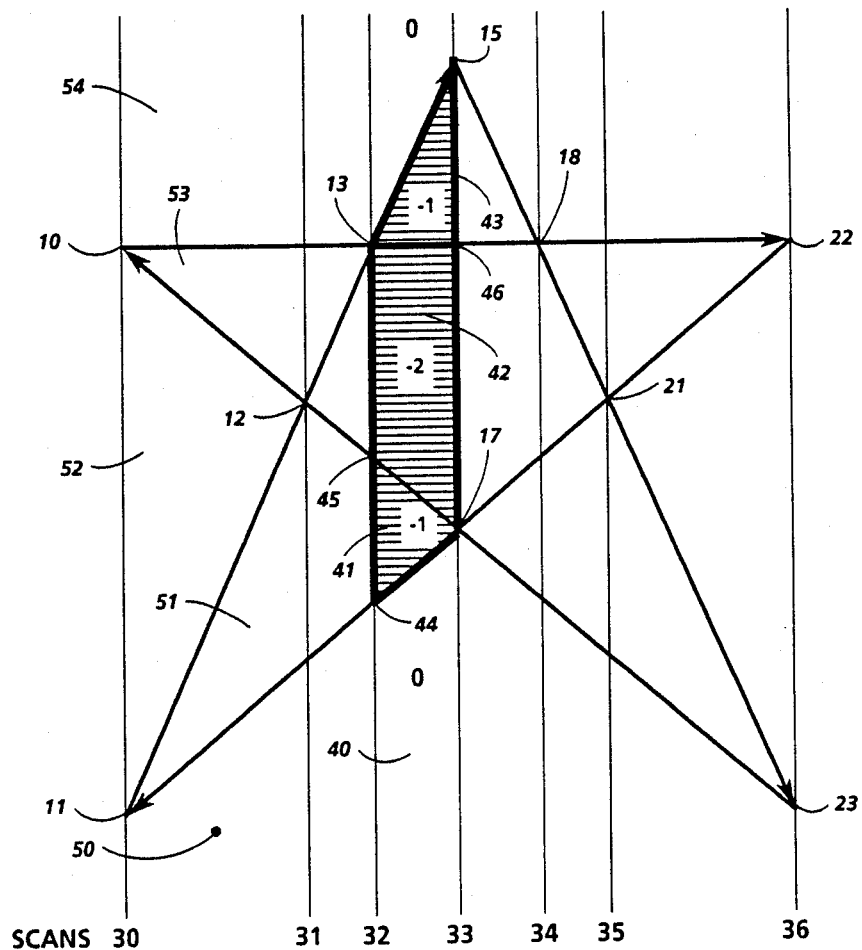
FIG. 1a comprises a graphic description of the process applied to a star-shaped trajectory.

The problem is defined in FIG. 1a which shows, as an example, an outline having a plurality of crossed vectors and concave features. More specifically, the shape is a star comprising five vectors, and the problem is to define, for each raster, the start and end points of the portion of the raster that should be filled in. For the purposes of this discussion we will assume that the open space is white and that the filled-in area will be solid black, but other colors can be used. Also, any bit pattern, such as a checkerboard, may be used to fill in an outline.

The first step in the solution of the problem is the realization that if the area can be partitioned into a series of trapezoids having vertical sides, then the algorithm can proceed efficiently. That is to say, for a defined raster, if the beginning and end points can be easily defined, then the writing beam only needs to be turned on at the defined starting point and off at the end point. There is no longer a need to test each point. Additionally, if the start and end points are defined as vertical lines, the computation load is reduced.

This entire process may be done in software, but if the printing speed of the printer is higher than the computational speed of the software, some portion of the process that is more easily handled in hardware may be handed off. For instance, the software may compute the starting and ending points for a set of rasters, and the hardware may do the actual writing.

The first step is to determine the number of vector intersections there are in the outline. In the FIG. 1 example there are a total of ten, five at the points of the star 10, 15, 22, 23 and 11, and five internal intersections 12, 13, 18, 21, and 17. Through each is defined a vertical line 30 through 36.

In view of the vertical lines and the original vectors there are a number of closed-in areas, some of which, like area 52 are not within the outline, and others, like area 41, which are within the area. The next step is to decide which are within the outline. The basic test is to start at any point outside the outline to be tested with a count of zero and proceed through the outline consistently in one direction, incrementing the count for any vector that is crossed if the vector is proceeding in a left to right direction, and decrementing the count if the vector crosses in a right to left direction. If the count for any area is any number other than zero (or odd, depending on the convention chosen), that area is within the outline. This count, or number, is referred to as the winding number.

Using area 40 as an example, starting with a count of zero, and choosing to proceed in an upward direction, it will be seen that the first vector, from point 22 to point 11, is crossing in a right to left direction for a count of −1. Therefore the area immediately above this vector is within the outline. The next vector crossed, point 23 to point 10, is also right to left, resulting in a count of −2. Therefore the area above this vector is also within the outline. The next vector crossed, point 10 to 22, is left to right. The count becomes −1 and therefore the area above this vector is also within the outline. Finally the last vector, from point 11 to point 15, is crossed. It is from left to right, the count is incremented to zero, showing that the area above this vector is not within the outline. Finally the areas are combined to show that the trapezoid between points 44, 17, 15 and 13 is within the outline.

Using the same process and starting at point 50, it is shown by the same reasoning that areas 51 and 53 are within the outline but area 52, having a count of zero, is not.

One special case is where the starting point of the first vector is not the same as the end point of the last vector. In other words, the outline is not closed. In this case the software will generate an additional vector from the final point to the starting point, and use this closed outline as its area to be filled. Another special case is where part of the area is off the page. In this case the software will truncate the outline at the edge of the page, and then process the outline in the usual way. An algorithm that can be used for this application is the Sutherland-Hodgman clipping algorithm described on pages 451 through 455 of Fundamentals of Interactive Computer Graphics by Foley and Van Dam.

Having generated the trapezoid, any well known algorithm for filling it in may be used. See, for instance, the Basic Incremental Algorithm on pages 432 and 433 of the above-cited book which will define line boundaries and fill in all points on a scan line between points $s_s$ and $s_e$.

The following is the algorithm for filling an outline generated by a series of arbitrary vectors with a predetermined fill pattern. No assumptions are made about hardware or language since any general purpose hardware and software can be used. The disclosed embodiment uses an Intel 80186 processor and assumes the PLM or Pascal language is being used, but the algorithm can be implemented in any language. The following is written in a pseudo language similar to Pascal and relies on the following definition of terms.

---

Definitions:

An edge $e = \{x_s, y_s, x_e, y_e\}$ is defined to be intersecting the scanline x if and only if
$((x_s <= x)$ and $(x_e > x))$ or $((x_e <= x)$ and $(x_s > x))$.
From this definition we can conclude that edges with infinite slope (vertical lines with $x_s - x_e$) never cross any scanline and can be disregarded. Also an edge with one vertex on a particular scanline x, and other vertex lying to the left of x, does not -continued

Definitions:

cross that scanline either. This way vertices already processed are disregarded.
The slope of an edge $e = \{x_s, y_s, x_e, y_e\}$ is defined as
$s = dy/dx = (y_e - y_s)/(x_e - x_s)$.
The range of possible values of a slope variable is limited by the actual page size.
So, for 17 × 11 inch paper at 300 dpi, given
$0 < = y < = 5100$ (x = number of scans per page), and
$0 < = y < = 3300$ (y = number of bits per scan),
the maximum visible value of a slope variable is defined to be 3300.0, and the
minimum visible value of a slope variable is 1/5100. In general, for nXm dots per
page, n being number of bits per scan and m being number of scans per page,
$S_{MAX} = n$ and $S_{MIN} = 1/m$. Then, we say that the slope m is infinite if and only if $|m| > S_{MAX}$, and the slope s is zero if and only if $|s| < S_{MIN}$.
Two edges $e_1(x) = s_1*(x - x_{s1}) + y_{s1}$ and $e_2(x) = s_2*x - x_{s2}) + y_{s2}$ are crossing at a
point(x,y), where
$s_1*(x - x_{s1}) + y_{s1} = s_2*(x - x_{s2}) + y_{s2}$;
$s_1*(x - s_1*x_{s1} + x_{s1} - s_2*x_{2s}) + (y_{s2} - y_{s1})$;
$x = [(s_1*x_{s1} - s_2*x_{s2}) + (y_{s2} - y_1)]/(s_1 - s_2)$;
$y = s_1*(x - x_{s1}) + y_{s1}$.

PROCEDURE: MaskFill
    Begin
1. get outline;
2. for every trajectory t in the outline do;
    begin
3.   transform all vertices in t to device coordinate system
4.   clip trajectory t;
    end for loop
5. find all the scan lines where two or more edges of the outline cross
    (these include vertices);
6. sort scanlines found in step (5) from left to right, eliminate duplicates;
7. for every scanline x in the sorted list do;
    begin
8.   find all the edges Intersecting scanline x;
9.   sort them by their intersection point value with scanline x by
    going from bottom to top, and
    if intersection point of two or more edges is the same, then by
    going from edge with the most negative slope to the edge with the most
    positive slope (duplicates are retained);
10. set winding number state to "Not Fill"
11. for every edge *in the sorted list, do
    begin
12.   update winding number;
13.   if winding number state changes from "Not Fill" to "Fill"** then
    begin
14.     define trapezoid parameters $x_s$, $y_s$, $s_s$(or $y_s$)*, and $x_e$ from the next
      value in the list of sorted scanlines
    end if-then;
15.   else if winding number state changes from "Fill" to "Not Fill"
    then begin
16.     define trapezoid parameters $y_e$ and $s_e$ (or $y_e'$)*,
17.     apply Vector-toRaster conversion to trapezoid defined using
      parameters $x_s$, $y_s$, $x_e$, $y_e$, $s_s$ (or $y_s'$)*, and $s_e$(or $y_e'$)*(see Basic
      Incremental Algorithm.)***;
    end if-then;
  end for-loop;
18. delete all the scanline x information;
  end for-loop;
19. delete outline;
  END MaskFill;

Notes
*edge can be defined as a 4-tuple (x,y, $x_{next}$, $y_{next}$)or as a 4-tuple (x,y,$x_{next}$, $y_s$)
**depending on winding number convention, states can be defined as follows:
Zero winding number convention, 0 = "NotFill", not 0 = "Fill"
Odd winding number convention, Odd = "Fill", Even = "NotFill"
***The algorithm to fill in a trapezoid can be implemented in software or hardware.

In this program, line 1 fetches the vector information. In lines 2 through 4 if the image goes off the page, the excess is truncated. The "transform" in line 3 stands for any transformation between the coordinates of the vectors that are received as the input, and the coordinates that are used internally in the printer. As an example, the vector generator may use the upper left corner of the display as the zero point, or the origin, of the display while the printer may use the center of the display. Also, the resolutions in terms of spots per inch may be different. The input coordinates are transformed into printer coordinates before proceeding with the algorithm.

The conversion starts at line 5 where scan lines, shown as vertical lines in FIG. 1, are constructed through every intersection point between two or more vectors. The scan lines are sorted, from left to right, and duplicates are eliminated in line 6.

In lines 7 through 9, the edges are sorted by intersection point and slope. First the points are sorted, lower points first. Next, for multiple vectors through the same point, the sort will put the more negative slopes ahead of the more positive ones. The resultant sort separates the areas to the right of the current scan line into areas that are sorted from bottom to top. The algorithm will pick a point to the right of the current scan line and above the intersecting vector as being representative of the current area to be tested by the winding number.

The winding number is set to "Not Fill" in line 10. Then in lines 11 and 12 the winding number for each area will be updated by going through each vector. If, line 13, the winding number state changes from "Not Fill" to "Fill", then an area defined at line 14 as starting at the xy coordinates of the intersection point and proceeding to the next scan line to the right along the current vector is generated, which corresponds to the area to be filled in.

From line 15 to line 17, if the winding number state changes from "Fill" to "Not Fill", then the algorithm defines the upper edge of the trapezoid by defining a starting point and vector. The results is in the form of six items of data which define the trapezoid. The six are the identities of two vertical scan lines defining the left and right edges of the trapezoid, two values of y which define the two points on the left scan line that correspond to the two left corners of the trapezoid, and two slopes which define the lower and upper edges of the outline or two values of y which define the two points on the right scan line that correspond to the two right corners of the trapezoid. These data items are then used to rasterize the trapezoid. When all loops are ended the process is completed. At the end of the computations, lines 18 and 19, the information is deleted to free the memory that had been used.

Figure 1B:
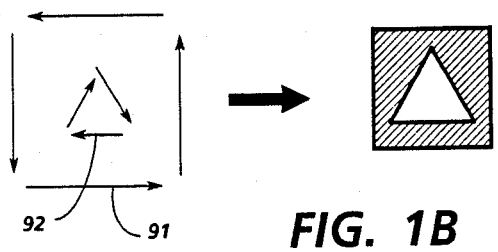
FIGS. 1b and 1c comprise graphic descriptions of the process applied to overlayed trajectories.
Figure 1C:
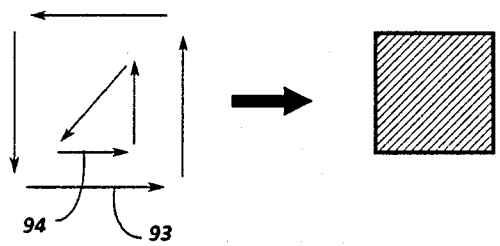
Figure 2A:
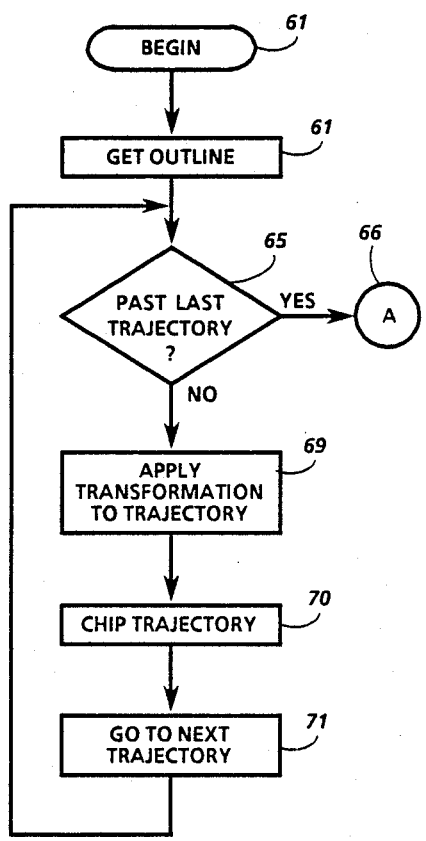
FIGS. 2a and 2b comprise a flow chart of the algorithm.
Figure 3:
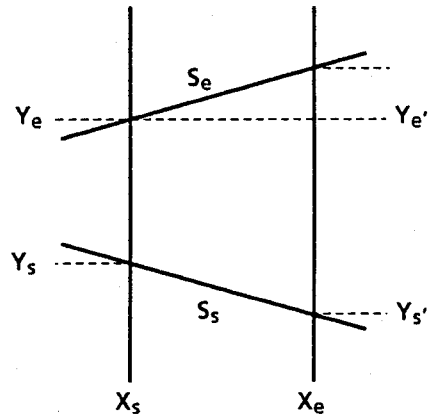
FIG. 3 is a diagram of a trapezoid defined by the four corner points (and/or slopes).
Figure 2B:
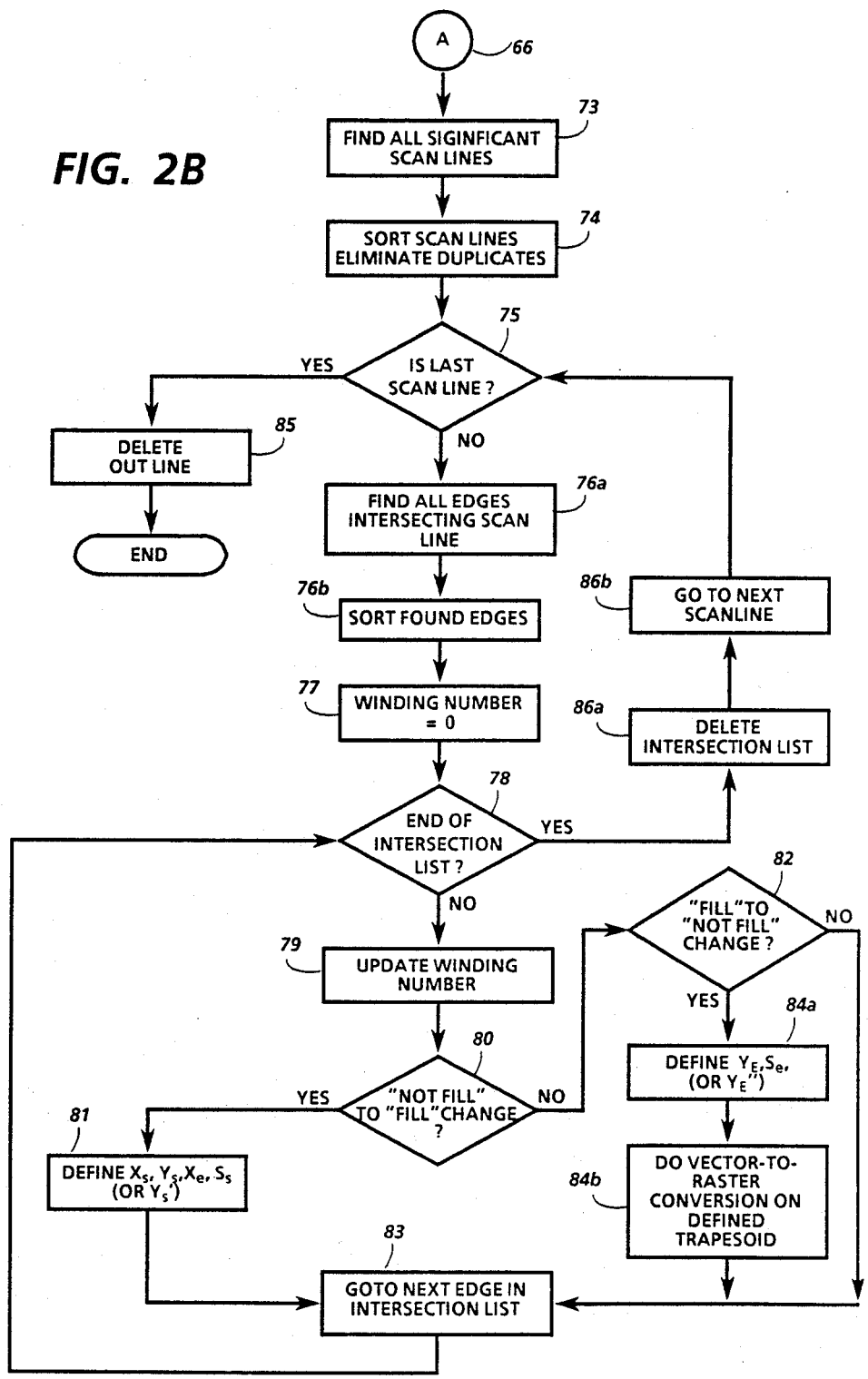

The flow of the algorithm can be visualized more clearly with respect to FIGS. 2a and 2b which comprise a flow chart of the algorithm. The first step 61 is to get the outline which may be defined as a graphic object of arbitrary shape that consists of one or more trajectories. A trajectory is defined as a graphic object comprising one or more line segments or edges, and a segment or edge is defined as an ordered pair of points $e=((x_s,y_s), (x_e,y_e))$, defining the (x,y) coordinates of the start (s) and end (e) points. For example, the star of FIG. 1a has one trajectory having five vectors. FIGS. 1b and 1c are examples of outlines with two trajectories.

At step 65 there is a test for the last trajectory. If yes, the program goes to the next figure. If no, the transformation from input to printer format is accomplished at step 69. At step 70 the outline is conformed to the edge of the page in the case where the outline goes beyond the edge of the page, and step 71 returns the program to step 65.

When all trajectories are processed, the program branches to point A in FIG. 2b. At step 73 all scan lines through vector intersection points are identified. At 74 these are sorted and duplicates discarded. If, at 75, the current scan line is the last one, then by definition, there are no areas to the right of the current scan line to be filled, the entire outline is cleared from memory at 85 and the program ends.

If this is not the last scan line, then at steps 76a and ib and 77 all vectors going through the point are identified, and the winding number is set to zero. If it is determined at point 78 that the intersection list is completed, then the current intersection list is deleted at step 86a and the program starts to process the next scan line. If there are more points in the current line, then at step 79 the winding number is updated for the next area and tested at 80 for zero. If it has gone from zero to non-zero, then it is known that the last vector passed is the lower boundary of the area to be filled in. The program at this point defines the two lower corners of the area by defining the x,y starting point, the ending scan line and the slope of the vector at step 81. The program then goes on to the next edge in the intersection list at step 83. If the winding number did not go to zero, then the program continues at 82 where a non-zero to zero change is tested for. This would happen at the upper edge of the area to be filled in. If this boundary is found, the program at step 84a and b will define the remaining two pieces of data needed to define the trapezoid, namely the y coordinate of the upper left corner and the slope of the upper vector. If there was no change at step 82, the program must still be within the area to be filled in, and the program will continue through step 83.

FIGS. 1b and 1c demonstrate how overlapped images are processed. From inspection it can be seen that since vectors 91 and 92 of FIG. 1b are opposite in direction, the winding number inside the triangle will be zero and that area will not be filled in. In FIG. 1b, vectors 93 and 94 are in the same direction so the area internal to the triangle will be filled in. Using the rules stated herein, the user generating the original trajectories therefore has control over the fill-in process of any arbitrary outline.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A method of displaying a filled in outline on a raster output scanner by partitioning said outline into trapezoids having parallel sides in the fast scan direction of said raster output scanner, said outline defined as one or more trajectories, each trajectory comprising a plurality of connected vectors, comprising the steps of:
    first determining the location of all intersecting points between vectors,
    second determining the location of all parallel scan lines passing through said intersecting points,
    calculating a winding number for each area bounded by said vectors and lines, and
    combining all adjacent areas separated only by vectors, but not by parallel lines, and having winding numbers in the fill state, to produce a final set of trapezoids, and
    filling in said final set of trapezoids.

2. The method of claim 1 wherein the winding number for a first area is calculated as one more or less than the winding number of a second area that is separated from said first area by a single vector, the direction of said single vector between said areas determining whether the winding number of the second area is one more or less than the first, and wherein the area outside the outline is assigned a number of 0.

3. The method of claim 1 wherein numbers in the fill state are defined as odd numbers.

4. The method of claim 1 wherein numbers in the fill state are defined as non-zero numbers.

5. A method of filling in an outline generated as one or more trajectories, each trajectory comprising a plurality of vectors, said outline to be printed on a raster output scanner, comprising the steps of:
    determining the location of all points where said vectors intersect,
    identifying all scan lines intersecting said points, said scan lines and said vectors dividing said outline into areas bounded on two sides by scan lines and on two sides by vectors, calculating a winding number for each area, combining into one trapezoid all adjacent areas that have winding numbers in the "Fill" state and which are separated only by vectors, and filling in all trapezoids.

6. The method of claim 5 wherein said winding number for a first area is calculated as one more or less than the winding number of a second area that is separated from said first area by a single vector, the direction of said vector between said areas determining whether the winding number of the second area is one more or less than the first.

7. The method of claim 5 wherein numbers in the fill state are defined as odd numbers.

8. The method of claim 5 wherein numbers in the fill state are defined as non-zero numbers.

* * * * *